Feb. 22, 1955     O. F. ARTHUR     2,702,641
CARRIER RACK FOR DRUMS

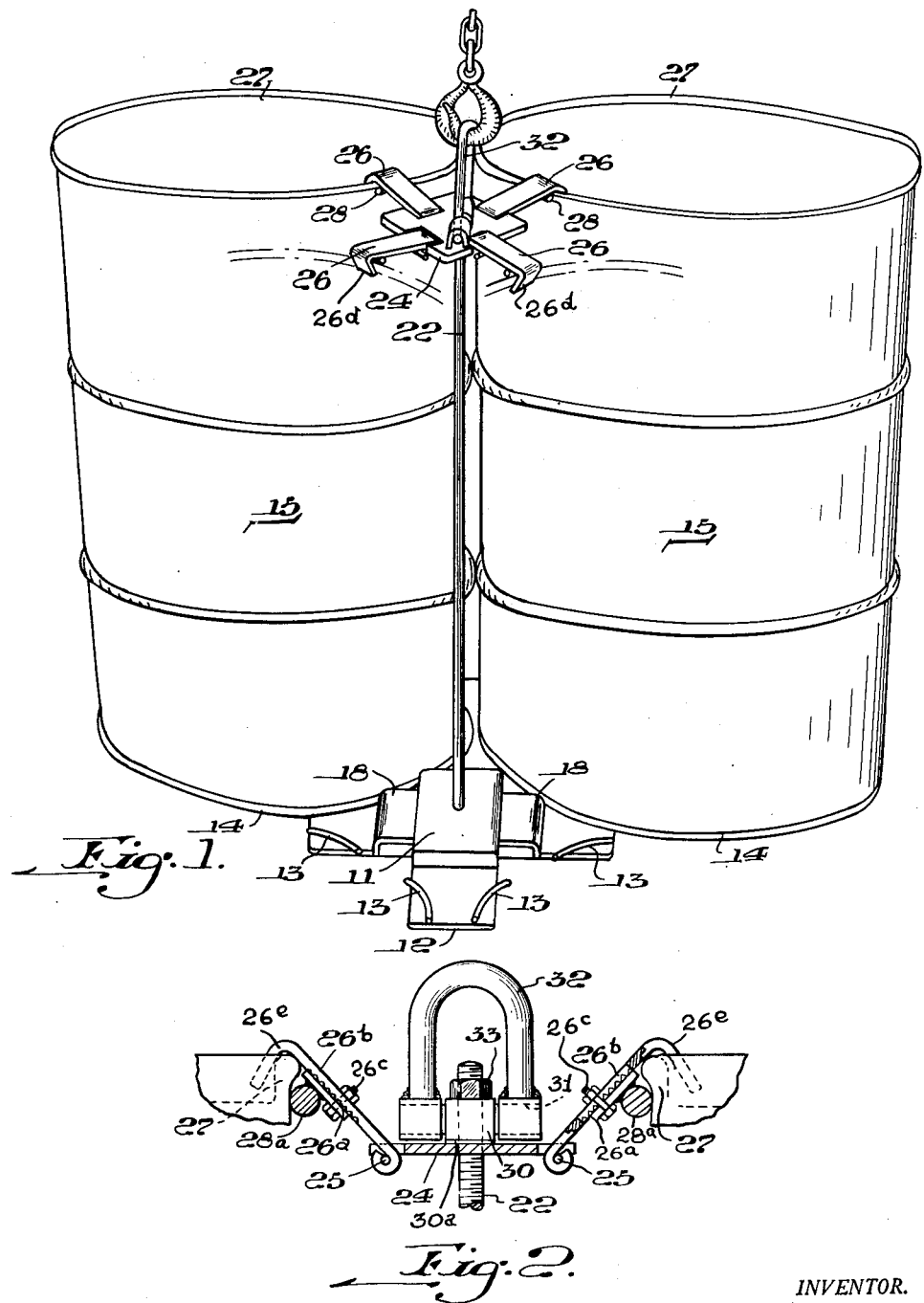

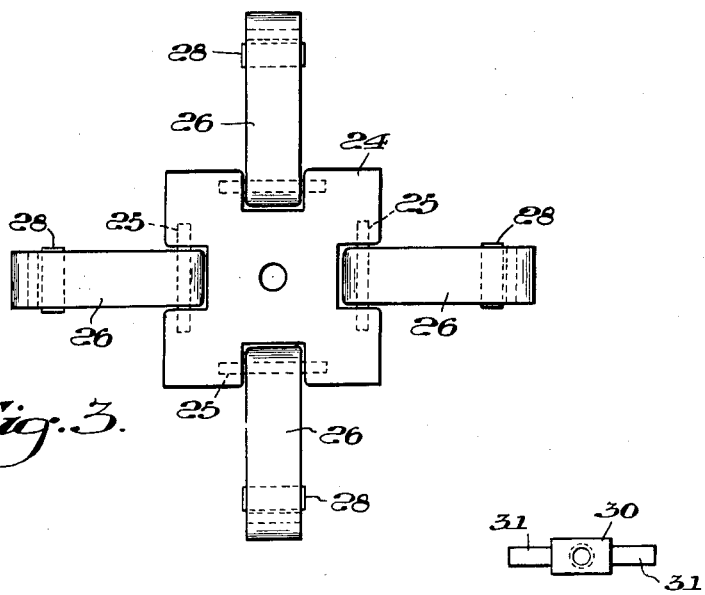
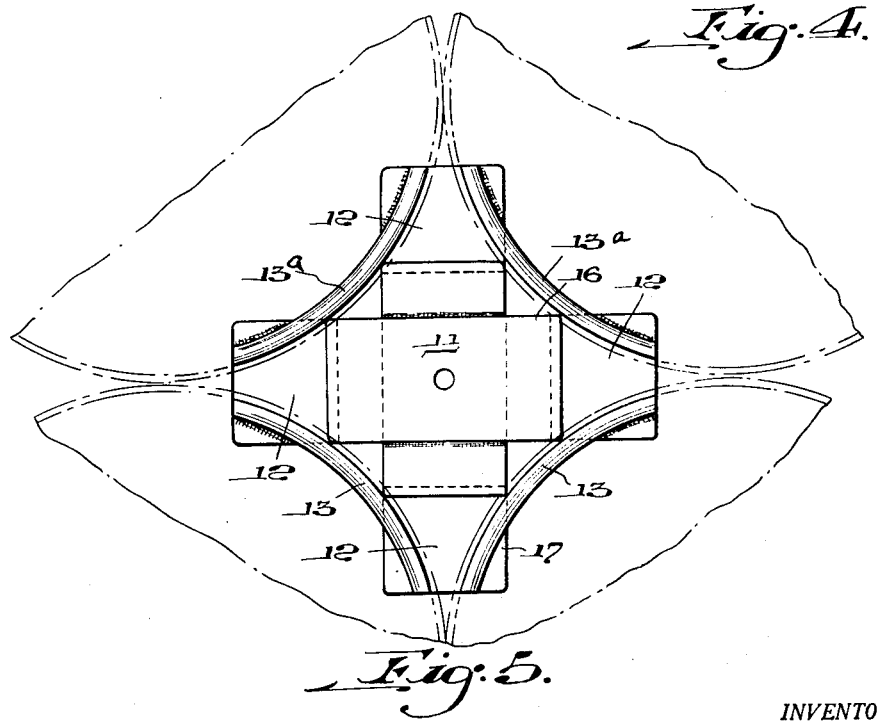

Filed Feb. 19, 1952     3 Sheets-Sheet 3

INVENTOR.
OSCAR F. ARTHUR

BY Ashworth Martin his ATTORNEY.

United States Patent Office 2,702,641
Patented Feb. 22, 1955

2,702,641

CARRIER RACK FOR DRUMS

Oscar F. Arthur, Connellsville, Pa., assignor to Arthur Industries Incorporated, Connellsville, Pa., a corporation of Pennsylvania Application February 19, 1952, Serial No. 272,331

5 Claims. (Cl. 211—71)

My invention relates to carrier racks for steel drums, barrels, and the like, and has for one of its objects the provision of a carrier rack that can readily be connected to a plurality of drums in such manner that the drums can be handled as a unit, by hoisting chains, lift trucks, etc., and can easily be stacked for storage or cargo shipment, either in an upright position or sidewise positions of the drums, and wherein the rack members, when not in use, will occupy a relatively small amount of space.

Another object of my invention is to provide a carrier of the type referred to which will firmly hold a plurality of drums or barrels in unitarily assembled relation, without the necessity of encircling the drums with the holding members or extending the holding members beyond the peripheral boundaries of the assembled drums.

Figure 6:
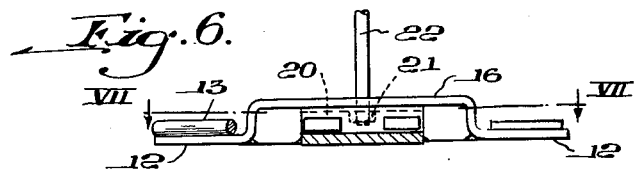
Figure 7:
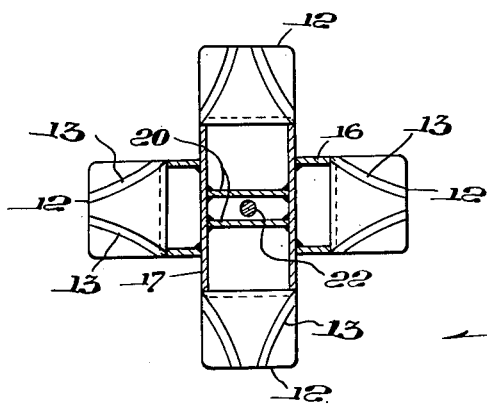
Figure 8:
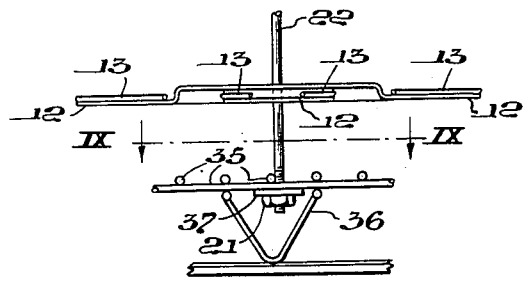
Figure 9:
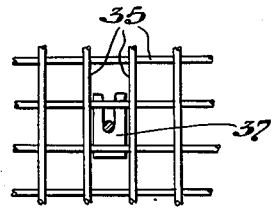
Figure 10:
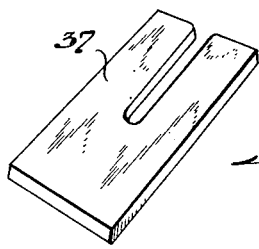

In the accompanying drawings, Figure 1 is a view showing the rack in assembled position with two drums, the other drums being omitted for clarity of illustration; Fig. 2 is a cross sectional view on an enlarged scale showing a modification of a portion of the upper clamping bracket of Fig. 1 and its arms; Fig. 3 is a plan view of a portion of the structure of Fig. 1; Fig. 4 is a detailed view of one of the swivel elements of Fig. 2; Fig. 5 is a plan view in slightly modified form of the base member of Fig. 1, on an enlarged scale; Fig. 6 is an elevational view of the base of Fig. 1; Fig. 7 is a view taken on the line VII—VII of Fig. 6; Fig. 8 is a fragmentary elevational view showing the manner in which the rack can be mounted upon a pallet which is transportable by fork-lift trucks; Fig. 9 is a view taken on the line IX—IX of Fig. 8, and Fig. 10 is an enlarged plan view of the key for detachably connecting the hanger bolt of Fig. 1 to the pallet.

The rack is here shown as comprising a base 11 having four extensions 12 of shelf-like form upon which the drums are supported. The shelves 12 have upstanding curved ribs 13 of heavy wire or the like welded thereto, for engagement against the inner peripheral surfaces of the flanges or rims 14 of the drums 15. In Fig. 5, each of the ribs 13a extends across two shelves 12, for greater strength.

The base comprises two plates 16 and 17 welded together in relatively crossed relation and stepped downwardly at their outer ends to form the shelves 12. Abutting surfaces 18 at the inner ends of the shelves assist in aligning the drums when they are placed on the base.

Rib-like stiffening members 20 are welded to the base, beneath the plate 17 (Figs. 6 and 7) for engagement by the head or nut 21 of a lifting rod 22, which, at its upper end, extends through a bracket plate 24.

The plate 24 has rods 25 welded to the underside thereof, to serve as pivotal supports for gripping arms 26 which may be modified to render them adjustable to suit rims of various sizes as indicated at 26a—26b in Fig. 2, where the opposed faces of 26a and 26b are serrated and the plates 26b slotted to receive bolts 26c. The hooked outer ends 26d of arms 26 of Fig. 1 and similar hooks 26e on arms 26b of Fig. 2 engage against the inner peripheries of the drum rims 27, there being studs 28 and 28a welded to the undersides of the arms 26 and 26a respectively, to maintain the drums 15 at evenly-spaced positions around the hanger rod 22.

When drums are placed on two or more of the shelves 12, then the bracket plate 24 is placed on the rod 22 with the hooked arms 26b in place as shown in Fig. 2. A swivel block 30 has a hole to receive the rod, and a washer 30a as interposed between the block 30 and the plate 24. This swivel member is rotatable on the rod 22 and has shaft-like extensions 31 for pivotally supporting a lifting eye or loop 32. Screwing down of a nut 33 will draw the hook members 26e tightly against the drum rims or beads. Hoisting chains or hooks will then be utilized to carry the drums to wherever needed. Groups of the drums can be stacked upon one another either in upright positions or laid on their sides. In the latter case, the clamping members will not only hold the drums in unitary relation but will hold them against rolling.

When stacking assembled groups of drums upon one another, the superposed units will be so swung about their vertical axes that the shelves 12 of a superposed rack will become seated on underlying drums, between the hooks 26 of the underlying rack, so that the weight of the upper drums will be transmitted directly through the shelves 12 to the underlying drums, thus making for greater stability in the stack. Again, the hanger loop 32, when released from a hoisting chain, will swing down to a plane below the uppermost planes of the hook arms 26, thus presenting no interference to stacking of the drums.

In Fig. 8, I show an arrangement wherein the carrier rack and the assembled drums may be mounted upon a pallet that is transportable by lift-fork trucks, such as one of the pallets shown in my application Serial No. 254,747, filed November 3, 1951. To attain this object, the lifting rod 22 is pushed downwardly so that its head 21 extends below the mesh-like deck 35 of a pallet which is here shown as having base legs 36 of V-form, the head of the bolt being disposed between the sloping portions of the central leg. Thereupon, a key plate 37 of the form shown in Fig. 10 is inserted between the undersurface of the mesh 35 and the bolt head, so that the carrier rack and the assembled drums will be held upon the pallet. Ordinarily, no reinforcement will be required at this connection, since no great strength is required to prevent shifting of the drums on the pallet and in cases where the drum rack is lifted by a chain hook, the bolt head and the key need support only the weight of the pallet.

The term "lifting rod" in the accompanying claims is used in a broad sense to include other forms of elongated lifting members such as cables or chains that can be substituted for the rod 22.

I claim as my invention:

1. A carrier rack for drums and the like that have axially-extending rims on their ends, comprising a base having radially-extending members in position to underlie the lower ends of drums grouped around the center of the base, means for preventing sliding of drums radially from off the said radial members, an upper rack member having clamping arms pivoted thereon on horizontal axes and radiating therefrom, hooks on the outer ends of the clamping arms, for engaging over the adjacent rims of drums arranged in said grouped arrangement at a plane above the upper rack member, a lifting rod with means thereon adjustably connecting the said base and rack member, to clamp drums in grouped arrangement, for movement as a unit, and a hoisting ring on the upper rack member and movable thereon to a plane entirely below that at which the hooks will make clamping engagement with the drums.

2. A carrier rack for drums and the like that have axially-extending rims on their ends, comprising a base having four shelf-like radially-extending members in position to underlie the lower ends of drums grouped around the center of the base, upstanding ribs on the outer ends of the shelf-like members, for engagement with the inner faces of the drum rims, to hold the drums against sliding off the base members, stop means at the inner ends of the shelf members, for aligning the drums, an upper rack member having four clamping arms pivoted thereon on horizontal axes and normally radiating upwardly therefrom, hooks on the outer ends of the clamping arms, for engaging over the adjacent rims of drums arranged in said grouped arrangement, and a lifting rod disposed below the normal uppermost plane of the arms and adjustably connecting the said base and rack, to clamp drums together, for movement as a unit.

3. A carrier rack for drums and the like, comprising a lifting rod having members radiating from its lower end, for supporting the lower ends of drums, a plurality of arms pivotally carried by the upper portion of the rod and normally sloping upwardly and outwardly therefrom to a plane above the rod, hooks on the upper ends of the arms which engage interior surfaces of the upper rims of the drums, plates longitudinally adjustable on the lower faces of the arms, stop shoulders on the bars in position to engage the sides of drums at points adjacent to said hooks, and a hoisting link on the rod, adjacent the inner ends of the arms and foldable to a plane between the upper and lower ends of the arms.

4. A carrier rack for drums and the like, that have axially-extending ribs on their ends, comprising a base having radially-extending members in position to underlie the lower ends of drums grouped around the center of the base, means for preventing sliding of drums radially from off the said radial members, an upper rack member having clamping arms pivoted thereon on horizontal axes and normally radiating therefrom in an upwardly-sloping direction, hooks on the outer ends of the clamping arms, for engaging over the adjacent rims of drums arranged in said grouped arrangement, a lifting rod disposed centrally of the base and the rack with means thereon for adjustably connecting the said base and upper rack member, to clamp drums in grouped arrangement, for movement as a unit, and a tiltable lifting element on the rod, disposed between the said arms, the upper ends of the arms normally occupying a plane above the rod and above the lifting element when the said element is tilted to its lowest position.

5. A carrier rack for drums and the like, comprising a lifting rod having members radiating from its lower end, for supporting the lower ends of drums, a plurality of arms pivotally carried by the upper portion of the rod and normally sloping upwardly and outwardly therefrom to a plane above the rod, hooks on the upper ends of the arms which engage interior surfaces of the upper rims of the drums, plates longitudinally adjustable on the lower faces of the arms, stop shoulders on the bars in position to engage the sides of drums at points adjacent to said hooks, a swivel member carried by the upper end of the lifting rod, for movement about a vertical axis, and a hoisting link connected to the swivel member, the link when folded to a horizontal position, and also the swivel, being disposed in a plane between the upper and lower ends of the hooks.

References Cited in the file of this patent
UNITED STATES PATENTS

| | | |
|---|---|---|
| 193,479 | Burgin | July 24, 1877 |
| 831,424 | Fravel | Sept. 18, 1906 |
| 1,963,548 | Ehrhardt | June 19, 1934 |
| 2,513,630 | Elliott | July 4, 1950 |
| 2,539,233 | Dickson | Jan. 23, 1951 |
| 2,613,823 | Johns | Oct. 14, 1952 |
| 2,614,711 | Houser | Oct. 14, 1952 |